July 10, 1934.  R. P. WISE  1,965,916
VEHICLE SIGNAL
Original Filed April 7, 1927  2 Sheets-Sheet 1
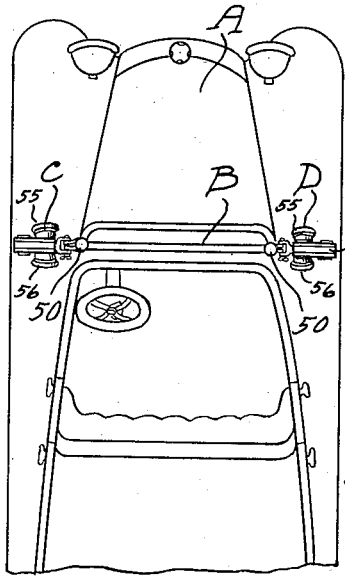
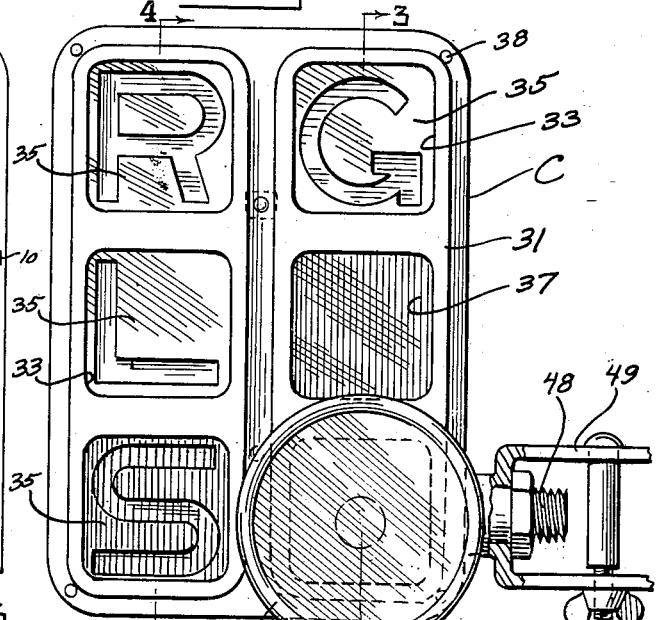
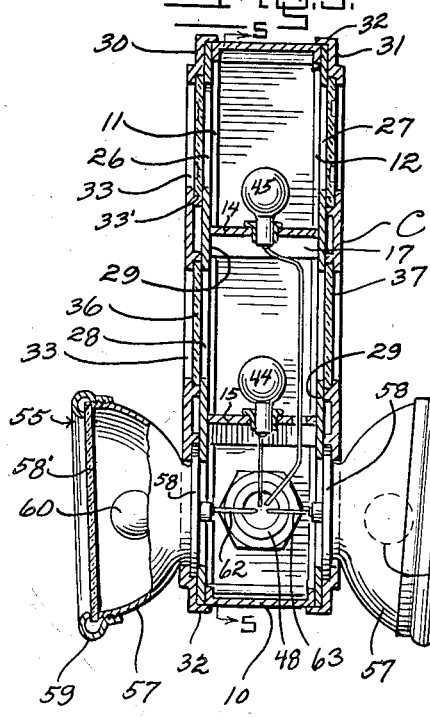
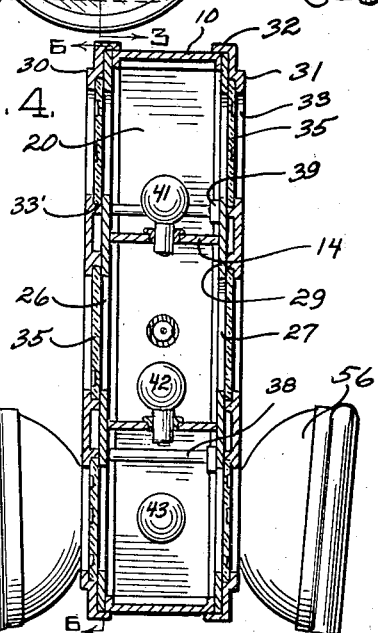
Robert P. Wise Inventor
By Lancaster Allwine
Attorneys July 10, 1934.  R. P. WISE  1,965,916
VEHICLE SIGNAL
Original Filed April 7, 1927  2 Sheets-Sheet 2
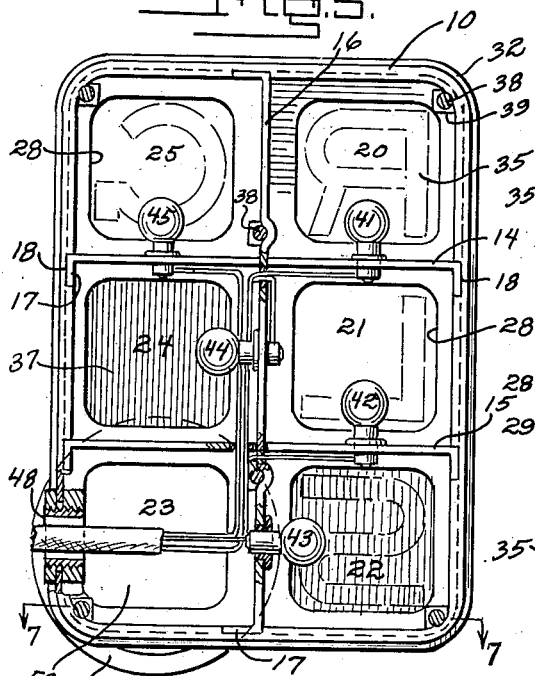
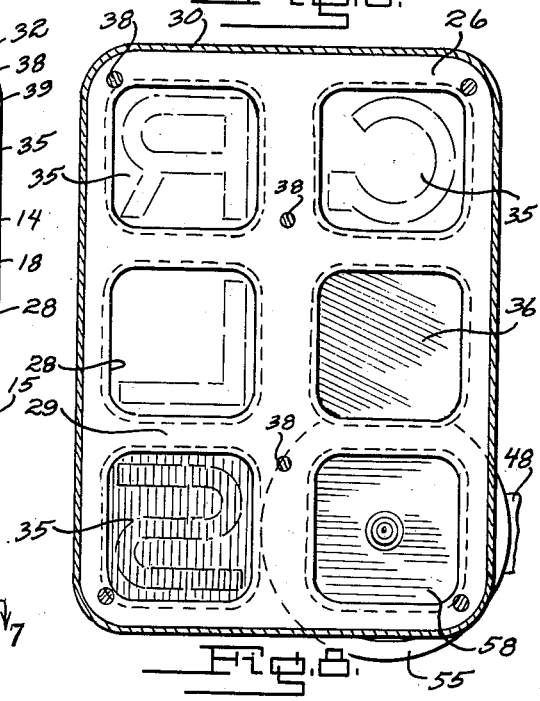
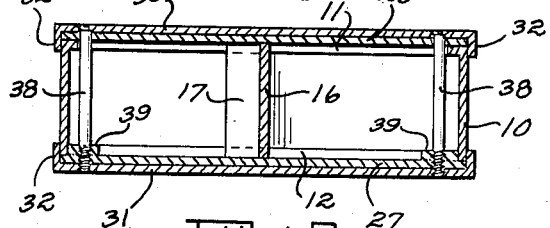
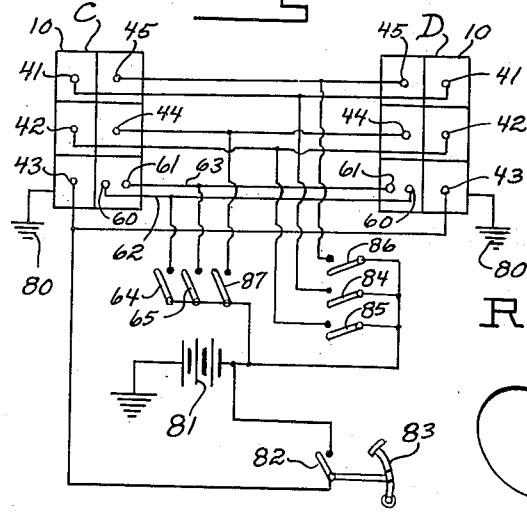
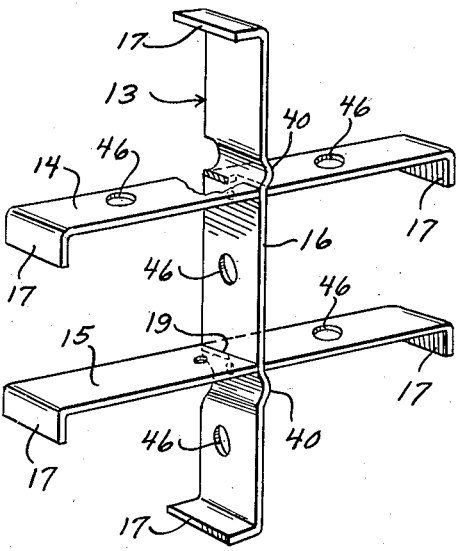
Robert P. Wise *Inventor*
By Lancaster Allwine *Attorneys*

Patented July 10, 1934

1,965,916

UNITED STATES PATENT OFFICE 1,965,916

VEHICLE SIGNAL

Robert P. Wise, Oklahoma City, Okla., assignor, by mesne assignments, of one-half to Robert M. Scott, Jr., Oklahoma City, Okla.

Application April 7, 1927, Serial No. 181,758
Renewed December 1, 1933

1 Claim. (Cl. 177—329)

The present invention relates to signaling apparatus for use upon motor vehicles, and the primary object of the invention is to provide an improved vehicle signalling device to be illuminated for informing pedestrians of vehicles either forwardly or rearwardly of the vehicle, the intended course or movement to be taken by the vehicle.

A further object of the invention is to provide a vehicle signal embodying an arrangement whereby light rays may be directed forwardly and rearwardly at the sides of the vehicle for illuminating the sides of the vehicle and also aiding in the backing of the vehicle and the making of repairs to the engine thereof.

A further object of the invention is to provide a vehicle signal adapted for attachment to opposite sides of the vehicle at a point preferably adjacent each end of the vehicle windshield, and embodying lights which may be used in addition to the usual headlights for casting rays of light upon the ground immediately forward of the vehicle, and which lights are so disposed with respect to the signalling lights of the device as to not interfere with the proper displaying of the signal lights while the combined driving and emergency lights are illuminated.

A still further object of the invention is to provide an improved vehicle signal having incorporated therein, independently operable signalling lights for indicating the intended course to be taken, the lights serving as a parking light and visible from both the front and rear of the signal, and combined driving and emergency lights for illuminating the sides of the vehicle and facilitating backing thereof.

A still further object of the invention is to provide a combined signalling and driving device embodying features of construction whereby the device is readily applicable to opposite sides of the vehicle by merely reversing the two glass panels of the parking light of the device.

A still further object of the invention is to provide a vehicle signal embodying a lamp support adapted for dividing the signal into a number of different and independently illuminated compartments, and embodying features of construction whereby the device may be readily and easily disassembled for the renewing of parts such as the illuminating lamps.

Other objects and advantages of the invention will be apparent during the course of the following detailed description, taken in connection with the accompanying drawings forming a part of this specification and in which drawings:

Figure 1 is a fragmentary top plan view of the forward portion of a motor vehicle and showing the improved signals in position upon the windshield of the vehicle.

Figure 2 is a plan view of the rear face of one of the improved signals, the same being that signal for mounting at the left side of the vehicle for proper displaying of the parking light of the signal.

Figure 3 is a vertical section on line 3—3 of Figure 2 and looking in the direction of the arrows.

Figure 4 is a vertical section on line 4—4 of Figure 2 and looking in the direction of the arrows.

Figure 5 is a vertical section taken substantially along the line 5—5 of Figure 3, looking in the direction of the arrows, and showing the arrangement of the light bulbs for each of the independent compartments formed by the lamp support.

Figure 6 is a vertical sectional view taken on line 6—6 of Figure 4, looking in the direction of the arrows, and showing the construction of the retaining plate for the signal panels at one side of the casing.

Figure 7 is a horizontal section on line 7—7 of Figure 5.

Figure 8 is a perspective view of the lamp support shown removed from the signal casing.

Figure 9 is a wiring diagram illustrating the manner in which the electrical circuit is completed through a pair of signals.

Referring to the drawings in detail, and wherein similar reference characters designate corresponding parts throughout the several views, the letter A designates a conventional type of motor vehicle provided with the usual windshield construction B and upon the opposite ends of which is shown mounted the improved signals C and D shown mounted at the left and right sides respectively of the vehicle A.

In the drawings, the signal C for mounting at the left side of the vehicle has been shown in detail.

The improved signal comprises an open metal frame or casing 10 of substantially rectangular shape in formation and which frame is provided at its front and rear edges with inturned marginal flanges 11 and 12 respectively, and which flanges serve as reinforcements for the front and rear edges of the frame.

Slidably insertable into the frame 10 from either open side thereof, is a compartment forming lamp support 13 formed from strips of metal of a width equal to the depth of the frame 10, embodying upper and lower partition plates 14 and 15 respectively, and a central vertically disposed partition plate 16. Each end of the partition plates 14, 15 and 16 is bent at a right angle for forming terminal bearing portions 17 which when the support is positioned within the frame 10 snugly engage at their outer faces, the inner surface of the frame for preventing shifting of the support within the frame. The flanges 11 and 12 of the frame 10 are each recessed as at 18 in Figure 5 for permitting the support to be readily positioned within the frame from either open side thereof with the outer faces of the terminal bearing portions 17 engaging the frame, and which recesses 18 serve for retaining the terminal portions of the partition plates in proper spaced relation at their ends. Each of the horizontally disposed partition plates 14 and 15 are cut away for one-half of their width at a point midway of the ends of the plates as illustrated in Figure 8, and are adapted to interfit with correspondingly cut away portions in the vertical partition plate 16 at points preferably disposed one-third way of the length or height of the plate 16. The joints 19 where the plates 14 and 15 connect with the plate 16, are preferably welded or soldered for retaining the plates in assembled relation and for preventing the escape of light through the joints from one compartment to another when the support is in position within the frame 10. The support 13 when positioned within the frame 10, and as will be apparent upon observing Figure 5, provides a number of separate and independent compartments 20, 21, 22, 23, 24, and 25, each of which is of a like dimension and separated one from another by the support partition plates, 14, 15 and 16. It may here be well to state that the offset terminal bearing portions 17 of the partition plates, by reason of their large area of contacting surface with the inner surface of the frame 10, prevents likelihood of the light from one compartment entering an adjacent compartment at the terminals of the partition plates.

Fitting in surface contact at the front and rear edges of the frame 10, are flat front and rear retaining plates 26 and 27 respectively of identical construction, and which plates are each provided with a like number of similarly shaped sight openings 28 which when the plates are in position are adapted to align one with each of the compartments provided by the lamp support 13. These retaining plates 26 and 27 are of a size equal to the external dimension of the frame 10 and when in position upon the front and rear edges of the frame have their web portions 29 between the sight openings 28, in surface contact with the edges of the partition plates 14, 15 and 16. Arranged over each of the retaining plates 26 and 27 respectively, are cover or face plates 30 and 31 each being provided with a marginal flange 32 adapted to overlie the marginal edges of the respective retaining plates 26 and 27 and extend for a distance inwardly over the external surface of the frame 10. These face or cover plates 30 and 31 and which are of identical construction, are provided with a number of marginally flanged sight openings 33 corresponding in number and configuration with the retaining plate sight openings 28, with the sight openings 33 of the face plates aligning with the sight openings 28 of their respective retaining plates. These marginally flanged sight openings 33 provide rabbets 33' which open inwardly at the border of each of the sight openings. As will be observed in Figures 3 and 4, the marginal portions of the face plates 30 and 31 engage in surface contact the outer faces of the marginal portions of their respective retaining plates, with the flanges 32 overlying the joints between the retaining plates and the flanges 11 and 12 of the frame 10 and that those portions of the face plates between the sight openings 33 engage in surface contact the web portions 29 of their respective retaining plates. When the face plates and retaining plates are in assembled relation it will be seen that the rabbets 33' form channel like pockets between the aligning face plate sight openings 33 and retaining plates sight openings 28.

Removably fitting in each of the pockets formed by the marginally flanged sight openings 33, and disposed at the front and rear of each of the compartments 20, 21, 22 and 25 are suitable panels or windows 35 which are preferably formed of transparent or translucent glass and each having delineated thereon in any preferred manner signalling letters clearly visible both at the front and rear side of the signal upon illumination of the lamp within the respective compartments. As will be observed in Figures 3 and 4, these signalling panels 35 and which may be colored in any desirable manner, are readily removable upon removal of the face plates 30 and 31. The signalling panels 35 are preferably arranged in the manner shown, the signalling panels for the compartment 20 preferably bearing the letter R designating a right turn, the panels for the compartment 21 bearing the letter L designating a left turn, the signalling panels for the compartment 22 preferably being colored red and bearing the letter S for designating stop, and the signalling panels for the compartment 25 bearing the letter G designating go.

Arranged in the pocket provided at the front side of the compartment 24 by the flanged sight opening 33 is a plain or white glass panel 36 which when the light within the compartment 24 is illuminated will cast a white light forwardly of the signal. Arranged in the pocket provided at the rear of the compartment 24 is a red colored glass panel 37 for directing a red beam of light to the rear of the signal when the lamp within the compartment 24 is illuminated. Thus it will be seen that the compartment 24 and panels 36 and 37 will serve as a parking light upon illumination of the lamp within the compartment. It may here be well to state that the only change to be made for application of the improved signals to each side of the vehicle A, is that the red and white panels 37 and 36 respectively of the compartment 24 be reversed for adapting the signal for attachment to the right side of the vehicle as at D in Figure 1. As will be observed, the parking light of the signal is arranged directly below the signalling panels bearings the letter G.

Extending rearwardly through the face plate 30 and retaining plate 26 at each corner of the plates, and two at the vertical center of the plates and intermediate the upper and lower edges thereof, are retaining or assembling bolts 38 each having a threaded end portion for threaded engagement in a corresponding nut 39 suitably secured as by welding or the like to the inner surface of the rear retaining plate 27. The threaded shank portion of each of the bolts 38, as shown in Figure 7, passes through the corresponding nut 39 and is threaded into the rear face plate 31 so that upon tightening of the bolts 38 the face and retaining plates will be drawn together into surface contact with the front and rear edges of the frame 10. The vertical partition plate 16 of the lamp support 13 is provided with transversely offset channel portions 40 for accommodating the retaining bolts 38 which are disposed at the vertical center of the frame. These retaining bolts which are disposed at the vertical center of the frame serve for drawing the web portions 29 of the retaining plates 26 and 27 into firm surface contact with the edges of the partition plates 14, 15 and 16 for preventing the escape of light from one compartment to another when the lamp within either of the compartments is illuminated.

Disposed in each of the compartments 20, 21, 22, 24 and 25 are suitable electric light bulbs 41, 42, 43, 44 and 45 respectively, and each of which bulbs preferably has its sockets grounded to the metal lamp support 13. The sockets for the respective lamps are preferably mounted in suitable apertures 46 provided in the partition plates of the lamp support, and it is preferred that the sockets be secured to the partition plates as by soldering or welding.

Suitably mounted in one side wall of the frame 10 and preferably opening into the compartment 23, is a tubular bracket arm 48 and through which conductor wires are led to one terminal of each of the bulbs 41, 42, 43, 44 and 45. Secured to the projecting end of the tubular bracket arm 48 is a suitable attaching clamp 49 whereby the signal may be attached to the vehicle, and it is preferred that the signals be either attached to the uprights 50 of the vehicle windshield frame B or to the vehicle body adjacent the opposite ends of the windshield frame. By observing Figure 1 it will be seen that when the signals are in position that the signalling panels or windows 35 will be clearly visible both from the front and rear of the vehicle and at both sides thereof.

Supported in each of the pockets at the front and rear of the compartment 23, are combined driving and emergency lights 55 and 56 which are of identical construction, the light 55 being mounted at the front side of the signal and the light 56 being mounted at the rear of the signal. These lights each embody a downwardly inclined reflector portion 57 and a flat rectangular shaped attaching plate 58 forming a marginal flange at the inner end of the reflector portion for positioning in the pocket formed by the face and retaining plate at each side of the compartment 23. Provided at the face of the reflector portion is a lens 58' which is preferably formed of white or clear glass, and which lens may be retained in position by means of a suitable retaining ring 59 having threaded connection with the reflector portion. Mounted within the reflector portion 57 of the front light 55 is an electric lamp bulb 60 having its socket grounded to the metal reflector and opening into the compartment 23, and mounted in the reflector portion 57 of the rear light 56, is an electric light bulb 61 which also has its socket grounded to the metal reflector and opening into the compartment 23. Connected to the opposite terminal of the light bulbs 60 and 61 are conductor wires 62 and 63 respectively, and which wires as will be observed in Figure 3 extend through the tubular bracket arm 48 and are connected respectively to independent control switches 64 and 65. Thus it will be seen that upon illumination of the lamp 60 of the signals C and D, that light rays will be directed forwardly and downwardly at each side of the vehicle, while upon illumination of the lamp 61, of the signals C and D, that light rays will be directed rearwardly and downwardly along each side of the vehicle. Since the lights 55, 56 are disposed wholly outwardly of the compartment 23, it will be seen that the compartment 23 provides a suitable and desirable place for attachment of the tubular bracket arm 48 for lead in of the conductor wires for distribution to the various electric lamps mounted in the independent compartments of the signal.

The object in so mounting the lamps 55 and 56 below the signal compartments 24 and 25 is to prevent light rays from the lamps from interfering with the ready observing of the signals mounted at the compartments 24 and 25.

Referring to the wiring diagram illustrated in Figure 9, it will be seen that the metal frame 10 of each of the signals C and D is grounded as at 80 and that one terminal of the battery 81 is grounded thus permitting of a single wire arrangement being provided for the independent lamps of the pair of signals. The lamp 43 of the stop signal is preferably automatically illuminated by means of a suitable switch 82 connected with the foot brake lever 83. The lamps 41, 42, and 45 are preferably illuminated independently of one another by means of switches 84, 85 and 86 respectively, and which switches are preferably of an automatically breaking type when released by the operator. A suitable switch 87 is provided for illuminating the lamp 44 of the parking light, and which switch together with the switches 64 and 65 may be suitably mounted with the switches 84, 85 and 86 upon the steering wheel of the vehicle or if so desired mounted upon the instrument board of the vehicle. It will be observed that the circuit arrangement for the signals has been arranged so that operation of the selected switch will cause corresponding lamps of the signals C and D to be illuminated.

When the switch 87 is closed, the lamps 45 of each signal are illuminated and thus the compartments 24 act as a parking light for the vehicle. Upon closing of the switch 64 the lamps 60 of the companion signals will be illuminated for directing a beam of light forwardly and downwardly at each side of the vehicle, while closing of the switch 65 will illuminate the lamps 61 for directing beams of light rearwardly and downwardly at each side of the vehicle. Thus the lights 55 and 66 serve for illuminating both sides of the vehicle in a manner so as to render the sides of the vehicle clearly visible to approaching and passing vehicles and thus eliminating possibility of side swiping. The light beams cast forwardly by the lamps 60 will illuminate the engine or forward portion of the vehicle sufficiently to permit of repairs being made thereto at night, and will also serve as auxiliary driving or cowl lights, while the light projected rearwardly by the lamps 61 will illuminate the road to the rear of the vehicle for aiding in backing of the vehicle and also illuminate the running boards of the vehicle for aiding a person to enter or leave the vehicle at night.

By so providing the lights 55 and 56 with the flat attaching plates 58, it will be seen that the lights may be readily positioned at the compartment 23 by inserting the attaching plate flanges into the rabbet 33' in a like manner as the panels 35. The rectangular shaped attaching plates 58 are disposed at an angle to the sight openings 33 for positioning of the attaching plates in the rabbets.

From the foregoing description it will be apparent that a novel and improved type of vehicle signal has been provided embodying novel features of construction and assembly, one which when mounted upon the vehicle serves as a combined direction indicator, parking light, and emergency or auxiliary driving light, and which emergency lighting means serves for effectively illuminating the sides of the vehicle.

Changes in detail may be made to the specific form of the invention herein shown and described, without departing from the spirit of the invention or the scope of the following claim.

I claim:

In a vehicle direction signal, an open sided casing having a peripheral flange at its open side, a partition structure for the casing forming a plurality of compartments and having a dimension such as to cause it to fit closely between opposed parts of the wall of said casing, said flange being provided with recesses cut therethrough and forming spaced slots for receiving the end portions of said partition structure and in part supporting the same, closure means for the open side of said casing seated on said flange, and an apertured cover member fitting over such open side and holding the closure means in place.

ROBERT P. WISE.